B. HELLER.
INSECT DESTROYER.
APPLICATION FILED NOV. 29, 1920.

1,394,497.

Patented Oct. 18, 1921.

INVENTOR:
Benjamin Heller.
BY
ATTORNEYS.

UNITED STATES PATENT OFFICE.

BENJAMIN HELLER, OF CHICAGO, ILLINOIS.

INSECT-DESTROYER.

1,394,497.  Specification of Letters Patent.  Patented Oct. 18, 1921.

Application filed November 29, 1920. Serial No. 427,054.

*To all whom it may concern:*

Be it known that I, BENJAMIN HELLER, a citizen of the United States, residing at Chicago, in the county of Cook and State of Illinois, have invented new and useful Improvements in Insect-Destroyers, of which the following is a specification.

This invention relates to devices for exterminating ants and other insects, and its object is to accomplish this by a poisonous substance which is inclosed in a container and so arranged therein that it is not accessible to children or household pets, whereby all danger of children or others handling the device being poisoned is averted.

The invention also has for its object to provide a very simple and inexpensive container for the purpose stated.

The objects stated are attained by means of a novel combination and arrangement of parts to be hereinafter described and claimed, and in order that the same may be better understood, reference is had to the accompanying drawing forming a part of this specification.

Figure 1:
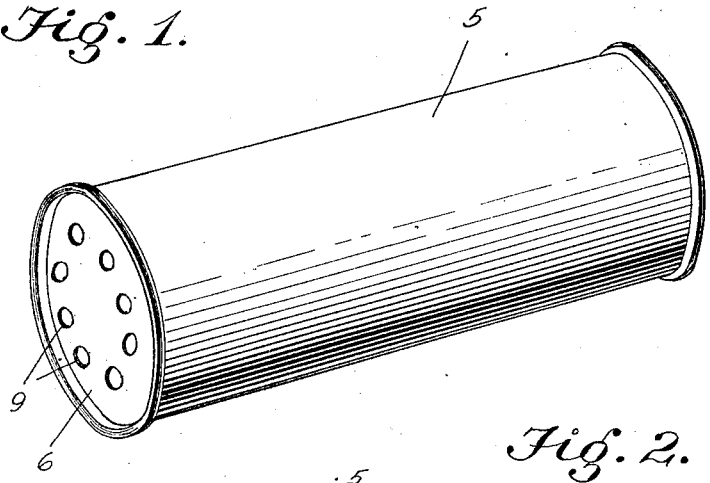
Figure 2:
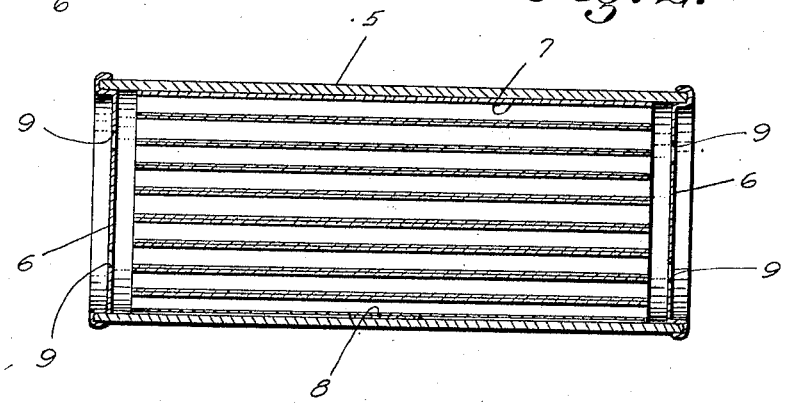
Figure 3:
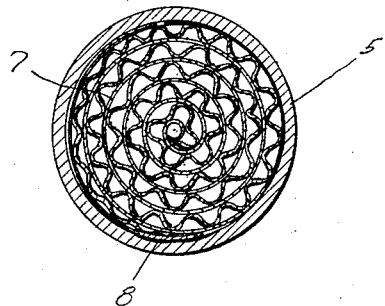

In the drawing, Figure 1 is a perspective view of the device; Fig. 2 is a central longitudinal section thereof, and Fig. 3 is a cross-section.

Referring specifically to the drawing 5 denotes a cylindrical container or receptacle made of paste-board, and closed at its ends by tin or other sheet-metal disks 6 which are united at their edges to the ends of the paste-board cylinder in any suitable manner so as to form permanent closures for the container ends.

Before the end disks 6 are applied to the container 5, there is placed in the latter a cellular filler which is impregnated or coated with a solution of arsenic, sugar and honey. The filler thus treated is dry, and the honey acts as a bait to attract the ants and other insects to be exterminated.

The filler hereinbefore referred to is composed of a sheet of corrugated paper 7 which is rolled up to produce a roll of a diameter to fit snugly in the container, the roll terminating at each end slightly short of the ends of the container 5. The corrugations run in the direction of the length of the container and they form a large number of cells into which the insects crawl. A strip of adhesive tape 8 may be applied over the end of the paper sheet on the outside of the roll to maintain the sheet in rolled-up shape. The paper sheet can be impregnated with the poisonous solution before or after it is rolled up, and after being so treated the roll is placed in the container 5 and the end disks 6 are applied.

The device is designed to be marketed completely closed, but in order that the insects may have access to the impregnated cellular filler, the end disks 6 will be formed with partly punched portions for producing entrance openings when said portions are pushed open or in, this being readily done as the disks are made of light tin or other thin sheet metal. The drawing shows these entrance openings at 9.

After the entrance openings 9 are made, the device can be laid in any place infected with ants or other insects, and as the poisonous cellular filler is completely inclosed, there is no danger of children or others getting poisoned by handling the device.

The device is very efficient for the purpose for which it has been designed, and it can be cheaply and easily manufactured.

I claim:

An insect exterminator, comprising a container, closures for the ends of the container and provided with insect entrances, and a cellular filler in the container, said filler being treated with a poisonous substance, and its cells being accessible from the entrance openings and running in the direction of the length of the container between the aforesaid end closures thereof.

In testimony whereof I affix my signature.

BENJAMIN HELLER.